United States Patent Office 3,746,549
Patented July 17, 1973

3,746,549
SPECTRALLY SENSITIZED PHOTOGRAPHIC EMULSIONS
Daniel A. Corretore, Jr., Webster, and Cynthia G. Ulbing, Fairport, N.Y., assignors to Eastman Kodak Company, Rochester, N.Y.
No Drawing. Filed Nov. 25, 1970, Ser. No. 92,895
Int. Cl. G03c 1/76
U.S. Cl. 96—126                    8 Claims

ABSTRACT OF THE DISCLOSURE

Spectral sensitization of negative silver halide emulsions is achieved by incorporating in the emulsion certain cyanine dyes which are known as strong desensitizers for negative emulsions and also including with the cyanine dye an alkali metal alkyl naphthalene sulfonate which unexpectedly reduces the desensitizing effect of the dye. Suitable cyanine dyes are electron acceptors which have a reduction potential less negative than minus 1.0 and an oxidation potential more positive than plus 0.4.

This invention relates to silver halide photographic elements and emulsions and more particularly to the spectral sensitization of negative emulsions with cyanine dyes that are normally desensitizers for negative emulsions.

A large number of cyanine dyes which are useful in fogged direct positive emulsions have been unavailable for use in negative emulsions because they are such strong desensitizers. Normally, the addition of these dyes to negative emulsions greatly reduces the inherent blue sensitivity of the silver halide and provides little if any spectral sensitization. In accordance with the present invention, we have discovered that these cyanine dyes which have desirable properties but which normally are strong desensitizers can be used to advantage in negative silver halide emulsions when incorporated in the emulsion with an alkyl naphthalene sulfonate.

As a result of our discovery, it is possible to obtain useful spectral sensitization in negative emulsions with dyes which were heretofore useless for this purpose because of their inefficient spectral sensitization and/or their desensitizing effects. In addition, these dyes can now be used in other layers of a negative-working photographic emulsion where previously the possibility of their migrating to the silver halide grain and causing severe desensitization precluded their use. For example, they can be used as filter dyes or antihalation dyes for negative-working silver halide photographic elements. In this use, they are incorporated advantageously in a layer other than a silver halide emulsion layer. Such a layer comprises (a) gelatin or other hydrophilic colloid, (b) the normally desensitizing cyanine dye and (c) an alkyl naphthalene sulfonate in an amount sufficient to reduce substantially the desensitizing effect of the dye.

Many of these cyanine dyes, which can now be used in negative emulsions in accordance with our invention, are readily bleached by developers. This makes them useful in photographic elements that are suitable for modern rapid processing techniques that have low water consumption and remove dyes by bleaching rather than washing. This type of processing is especially important in reducing water consumption and avoiding stream pollution.

The novel photographic emulsions of our invention in general comprise a negative silver halide emulsion, a cyanine dye which has a reduction potential less negative than minus 1.0 and an oxidation potential more positive than plus 0.4, and an alkyl naphthalene sulfonate. In the most advantageous embodiments of our invention, the emulsion is a gelatino-silver bromoiodide emulsion, the dye is an imidazo[4,5-b]quinoxaline cyanine dye and the sulfonate is an alkali metal triisopropyl naphthalene sulfonate.

The cyanine dyes which unexpectedly in accordance with the present invention are rendered useful in negative emulsions as spectral sensitizers, are well-known as desensitizers and for use as electron acceptor compounds in direct positive emulsions. They can be characterized by their polarographic half-wave potentials, i.e., their oxidation-reduction potentials as determined by polarography. Thus they are cyanine dyes having a reduction potential less negative than minus 1.0 and an oxidation potential more positive than plus 0.4.

To determine the oxidation and reduction potentials of such compounds, cathodic measurements can be made with a $1 \times 10^{-4}$ molar solution of the electron acceptor in a solvent, for example, methanol which is 0.05 molar in lithium chloride using a dropping mercury electrode, with the polarographic half-wave potential for the most positive cathodic wave being measured. Anodic measurements can be made with $1 \times 10^{-4}$ molar aqueous solvent solution, for example, methanolic solutions of the electron acceptor which are 0.05 molar in sodium acetate and 0.005 molar in acetic acid using a carbon paste of pyrolytic graphite electrode, with the voltametric half peak potential for the most negative anodic response being measured. In each measurement, the reference electrode can be an aqueous silver chloride (saturated potassium chloride) electrode at 20° C. Electrochemical measurements of this type are known in the art and are described, for example, in "New Instrumental Methods in Electrochemistry" by Delahay, Interscience Publishers, New York, N.Y., 1954; "Polarography" by Kolthoff et al., 2nd ed., Interscience Publishers, New York, N.Y., 1952; Anal. Chem. 36, 2426 (1964) by Elving; and Anal. Chem. 30, 1576 (1958) by Adams. Plus and minus signs are according to IUPAC, Stockholm Convention, 1953.

The cyanine dyes are useful in accordance with the present invention, particularly imidazoquinoxaline dyes such as those disclosed in Brooker et al., Belgian Pat. 660,253, of Mar. 15, 1965, and Brooker et al., U.S. Pat. 3,341,111, of Mar. 4, 1969; the bis-[-alkyl-2-phenylindone-3]-trimethine cyanine dyes described by Coenen et al., U.S. Pat. 2,930,694, of Mar. 29, 1960; and the cyanine dyes disclosed by Illingsworth, U.S. Pat. 3,501,310, of Mar. 17, 1970.

Examples of suitable cyanine dyes of the types described include the following:

6-chloro-2-[2-(1-methyl-2-phenyl-3-indolyl)vinyl]-1,3-diphenyl-1H-imidazo[4,5-b]quinoxalinium p-toluenesulfonate 1,1′,2,2′-tetramethyl-3,3′-indolocarbocyanine iodide 1,1′-dimethyl-2,2′-diphenyl-3,3′-indolocarbocyanine bromide 1,1′,3,3′-tetraethylimidazo[4,5-b]quinoxalinocarbocyanine chloride 1′,3-diethyl-6-nitrothia-2′-cyanine iodide 5-chloro-3-methyl-2-[2-(1-methyl-2-phenyl-3-indolyl)vinyl]-6-nitrobenzothiazolium p-toluenesulfonate 1′,3′-diallyl-1,3-diethyl-2-(imidazo[4,5-b]pyrido[2,3-e]pyrazino)-2-imidazo[4,5-b]quinoxalinocarbocyanine perchlorate 3,3′-diethyl-6,6′-dinitrothiacarbocyanine chloride 1′-methyl-2,2′,10-triphenyl-1,7-trimethylene-3,3′-indolocarbocyanine perchlorate Anhydro-3,3,3′,3′-tetramethyl-5,5′-dinitro-1,1′-bis(3-sulfobutyl)indocarbocyanine hydroxide, monosodium salt 3′-ethyl-1,3,3-trimethyl-5-nitroindo-oxacarbocyanine iodide 6-chloro-2-[(1-methyl-2-phenyl-3-indolyl)vinyl]-1,3-diphenylimidazo[4,5-b]quinoxalinium p-toluenesulfonate 1,1',3,3'-tetraethylimidazo[4,5-b]quinoxalinodicarbocyanine chloride 1,3-diethyl-2-[2-(1-methyl-2-phenyl-3-indolyl)vinyl]imidazo[4,5-b]quinoxalinium iodide 1,3-diallyl-2-[2-(3,5-dimethyl-1-phenyl-4-pyrazolyl)vinyl]imidazo[4,5-b]quinoxalinium iodide 6,6',7,7'-tetrachloro-1,1',3,3'-tetraphenylimidazo[4,5-b]quinoxalinocarbocyanine p-toluenesulfonate The cyanine dye is incorporated in the emulsion in a densensitizing amount, that is to say an amount that would normally desensitize a negative silver halide emulsion. The specific concentration which gives best results for each combination of variables, e.g., the particular emulsion and cyanine dye can be determined by routine testing but will normally lie in the range from about 10 to 1000 mg. per mole of silver halide.

The cyanine dye is added to the silver halide emulsion after it has been prepared by any of the known emulsion formulating techniques. It can be added to the otherwise finished emulsion before or after or with the addition of the alkyl naphthalene sulfonate. The alkyl naphthalene sulfonate, which as an alkali metal or ammonium salt, and preferably a sodium or potassium salt, is a well-known type of surfactant or wetting agent and we have unexpectedly discovered that its incorporation with the normally desensitizing cyanine dyes will reduce the desensitizing effect of the cyanine dyes and cause them to spectrally sensitize silver halide emulsions. Although in general any of the alkyl substituted naphthalene sulfonate salts will produce useful results in accordance with the invention, the preferred material of this class is a sodium or potassium triisopropyl naphthalene sulfonate. Particularly useful is the sodium salt of this type supplied by E. I. du Pont de Nemours and Company which is known as Alkanol B surfactant, and which is a mixture of the triisopropyl α- and β-naphthalene sulfonates, the relative amounts of the α- and β-isomers being approximately 10 and 90 mole percent, respectively.

The naphthalene sulfonate surfactant can be incorporated in the emulsion from a dilute aqueous solution, for example, of 5 to 25 weight percent concentration although greater or lesser concentrations of solution can be employed if desired. The surfactant solution is added to the emulsion in amounts approximating the amounts of surfactant such as saponin which are normally incorporated in photographic emulsions. Suitable concentrations of the naphthalene sulfonate range, for example, from about 100 to 2000 mg. of alkyl naphthalene sulfonate per mole of silver, although greater or lesser amounts can be employed. In preparing the novel emulsion compositions of the invention, the cyanine dye and the naphthalene sulfonate are added after the emulsion has been prepared and then washed and ripened by conventional procedures. Preferably, sensitizers such as sulfur and/or gold have also been added in conventional manner before the cyanine dye and naphthalene sulfonate are added. As we have indicated, the dye can be added before or after the naphthalene sulfonate or the two ingredients can be added simultaneously to the emulsion.

Further understanding of the principles of our invention can be gained from the following illustrative examples.

In the examples the desensitizing dye employed, which for convenience will be referred to hereinafter as Dye A, is as follows:

Dye A

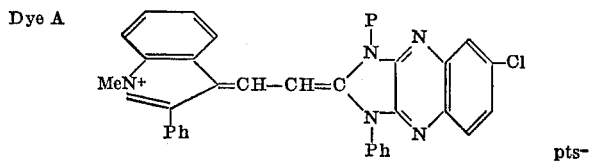

6-chloro-2-[2-(1-methyl-2-phenyl-3-indolyl)vinyl]1,3-diphenyl-1H-imidazo[4,5-b]quinoxalinium p-toluenesulfonate The first example describes a photographic element of the invention incorporating both Dye A and the additive, Alkanol B.

EXAMPLE 1

Three mg. of Dye A are dissolved in 20 ml. MeOH and added to 178 g. of a melt which contains 0.04 mole of a sulfur and gold-sensitized silver bromoiodide emulsion, 3.93 percent gelatin, 1.6 ml. of a solution of 153 g. saponin in 1000 ml. H$_2$O, and 5 ml. of Alkanol B solution (131 mg. in 1.0 ml. distilled H$_2$O). The dyed melt is held for 10 minutes at 40° C. then coated at 200 mg. Ag./ft.$^2$, 324 mg. gelatin/ft.$^2$ on cellulose acetate support.

The next example is a control example in which the emulsion contains neither the Dye A nor the Alkanol B additive.

EXAMPLE 2

A melt at 194.4 g. which contains 0.04 mole of a sulfur and gold-sensitized silver bromoiodide emulsion, 3.6 percent gelatin and 1.6 ml. of a solution of 153 g. saponin in 1000 ml. H$_2$O is coated at 200 mg. of Ag/ft.$^2$, 324 mg. gelatin/ft.$^2$ on cellulose acetate support.

The next example is another control example in which the emulsion contains Dye A but no Alkanol B additive.

EXAMPLE 3

Three mg. of Dye A are dissolved in 20 ml. MeOH and added to 178 g. of a melt which contains 0.04 mole of a sulfur and gold-sensitized silver bromoiodide emulsion, 3.93 percent gelatin, and 1.6 ml. of a solution of 153 g. saponin in 1000 ml. H$_2$O. This dyed melt is held 10 minutes at 40° C. and then coated at 200 mg. Ag/ft.$^2$, 324 mg. gelatin/ft.$^2$ on cellulose acetate support.

The emulsions of Examples 1, 2 and 3 are exposed on an Eastman 1B sensitometer 1/25 second to a 500 W tungsten source through: (1) Wratten 35+38A filters to determine blue speed of the emulsion which gives a measure of desensitization, (2) a Wratten 16 filter to determine the minus blue speed which gives a measure of the spectral response. After exposure, the samples are processed for 4 minutes at 20° C. in Kodak D-19 developer.

The results of these tests are as follows:

RELATIVE SPEED

| Ex. No. | Blue (Wr 35+38A) | Minus blue (Wr 16 filter) | λ Max. | Sens. range | Fog |
|---|---|---|---|---|---|
| 1 | 46 | 661 | 590 to | 625 | 0.04 |
| 2 | 100 | (¹) | 450 to | 530 | 0.24 |
| 3 | 18 | 120 | No def. max. to | 610 | 0.00 |

¹ No sensitization.

The data in the above table demonstrate clearly the increased spectral sensitization with reduced desensitization in the blue region which are obtained by the incorporation of Alkanol B with a desensitizing cyanine dye in the silver halide emulsion.

The photographic silver halide emulsions in accordance with this invention can comprise, for example, silver chloride, silver bromide, silver bromoiodide, silver chlorobromide, silver chloroiodide, silver chlorobromoiodide crystals or mixtures thereof. The emulsions may be coarse or fine grain emulsions prepared by any of the well-known techniques: e.g. single jet emulsions such as those described in Trivelli et al., "The Photographic Journal," vol. LXXIX, May 1939 (pp. 330–338), double jet emulsions such as Lippman emulsions, ammoniacal emulsions, thiocyanate or thioether ripened emulsions such as those described in Nietz et al., U.S. Pat. 2,222,264; Illingsworth U.S. Pat. 3,320,069; and McBride U.S. Pat. 3,271,157. Surface image emulsions may be used or internal image emulsions such as those described in Davey et al. U.S. Pat. 2,592,250; Porter et al. U.S. Pat. 3,206,313; and Bacon et al. U.S. Pat. 3,447,927. If desired, mixtures of surface and internal image emulsions may be used as described in Luckey et al. U.S. Pat. 2,996,382.

The emulsions may be regular grain emulsions such as the type described in Klein and Moisar, J. Phot. Sci., vol. 12, No. 5, September/October 1964, pp. 242–251.

The silver halide emulsions used with this invention may be unwashed or washed to remove soluble salts. In the latter case, the soluble salts may be removed by chill-setting and leaching or the emulsion may be coagulation washed, e.g. by the procedures described in Hewitson et al. U.S. Pat. 2,618,556; Yutzy et al. U.S. Pat. 2,614,928; Yackel U.S. Pat. 2,565,418; Hart et al., U.S. Pat. 3,241,969; and Waller et al. U.S. Pat. 2,489,341.

The emulsions may be sensitized with chemical sensitizers, such as with reducing agents; sulfur, selenium or tellurium compounds; gold, platinum or paladium compounds; or combinations of these. Suitable procedures are described in Sheppard et al. U.S. Pat. 1,623,499; Waller et al., U.S. Pat. 2,399,083; McVeigh U.S. Pat. 3,297,447; and Dunn U.S. Pat. 3,297,446.

Emulsions can be protected against the production of fog and can be stabilized against loss of sensitivity during keeping. Suitable antifoggants and stabilizers each used alone or in combination include thiazolium salts described in Brooker et al. U.S. Pat. 2,131,038 and Allen et al. U.S. Pat. 2,694,716; the azaindenes described in Piper U.S. Pat. 2,886,437 and Heimbach et al. U.S. Pat. 2,444,605; the mercury salts as described in Allen et al. U.S. Pat. 2,728,663; the urazoles described in Anderson et al. U.S. Pat. 3,287,135; the sulfocatechols described in Kennard et al. U.S. Pat. 3,236,652; the oximes described in Carroll et al. British Pat. 623,448; nitron, nitroindazoles; the mercaptotetrazoles described in Kendall et al. U.S. Pat. 2,403,927; Kennard et al. U.S. Pat. 3,266,897 and Luckey et al. U.S. Pat. 3,397,987; the polyvalent metal salts described in Jones U.S. Pat. 2,839,405; the thiuronium salts described in Herz et al. U.S. Pat. 3,220,839; the palladium, platinum and gold salts described in Trivelli et al. U.S. Pat. 2,556,263 and Yutzy et al. U.S. Pat. 2,597,915.

The photographic and other hardenable layers used in the practice of this invention can be hardened by various organic or inorganic hardeners, alone or in combination, such as the aldehydes, and blocked aldehydes, ketones, carboxylic and carbonic acid derivatives, sulfonate esters, sulfonyl halides and vinyl sulfonyl ethers, active halogen compounds, epoxy compounds, aziridines, active olefins, isocyanates, carbodiimides, mixed function hardeners and polymeric hardeners such as oxidized polysaccharides, e.g., dialdehyde starch, oxyguar gum and the like.

The photographic emulsions and elements can contain various colloids alone or in combination as vehicles, binding agents and various layers. Suitable hydrophilic materials include both naturally-occurring substances such as proteins, for example, gelatin, gelatin derivatives, cellulose derivatives, polysaccharides such as dextran, gum arabic and the like; and synthetic polymeric substances such as water soluble polyvinyl compounds like poly(vinylpyrrolidone), acrylamide polymers and the like.

The described photographic emulsion layers and other layers of a photographic element employed in the practice of this invention can also contain alone or in combination with hydrophilic, water-permeable colloids, other synthetic polymeric compounds such as dispersed vinyl compounds such as in latex form and particularly those which increase the dimensional stability of the photographic materials. Suitable synthetic polymers include those described, for example, in Nottorf U.S. Pat. 3,142,568 issued July 28, 1964; White U.S. Pat. 3,193,386 issued July 6, 1965; Houck et al. U.S. Pat. 3,062,674 issued Nov. 6, 1962; Houck et al. U.S. Pat. 3,220,844 issued Nov. 30, 1965; Ream et al. U.S. Pat. 3,287,289 issued Nov. 22, 1966; and Dykstra U.S. Pat. 3,411,911 issued Nov. 19, 1968; particularly effective are those water-insoluble polymers of alkyl acrylates and methacrylates, acrylic acid, sulfoalkyl acrylates or methacrylates, those which have cross-linking sites which facilitate hardening or curing, and those having recurring sulfobetaine untis as described in Dykstra Canadian Pat. 774,054.

The photographic elements used with this invention may contain antistatic or conducting layers, such layers may comprise soluble salts, e.g. chlorides, nitrates, etc., evaporated metal layers, ionic polymers such as as those described in Minsk U.S. Pat. 2,861,056 and Sterman et al. U.S. Pat. 3,206,312 or insoluble inorganic salts such as those described in Trevoy U.S. Pat. 3,428,451.

The photographic layers and other layers of a photographic element employed as described herein can be coated on a wide variety of supports. Typical supports include cellulose nitrate film, cellulose ester film, poly(vinyl acetal) film, polystyrene film, poly(ethylene terephthalate) film, polycarbonate film and related films of resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers and the like.

The photographic layers employed in the practice of this invention can contain plasticizers and lubricants such as polyalcohols, e.g. glycerin and diols of the type described in Milton et al. U.S. Pat. 2,960,404; fatty acids or esters such as those described in Robijns U.S. Pat. 2,588,765 and Duane U.S. Pat. 3,121,060; and silicone resins such as those described in Du Pont British Pat. 955,061.

The photographic elements employed in the practice of this invention may contain matting agents such as starch, titanium dioxide, zinc oxide, silica, polymeric beads including beads of the type described in Jelley et. al. U.S. Pat. 2,992,101 and Lynn U.S. Pat. 2,701,245.

The various layers, including the photographic layers, employed in the practice of this invention can contain light absorbing materials and filter dyes such as those described in Sawdey U.S. Pat. 3,253,921; Gaspar U.S. Pat. 2,274,782; Silberstein et al. U.S. Pat. 2,527,583 and VanCampen U.S. Pat. 2,956,879. If desired, the dyes can be mordanted, for example, as described in Jones et al. U.S. Pat. 3,282,699.

The sensitizing dyes and other addenda used in the practice of this invention may be added from water solutions or suitable organic solvent solutions may be used. The compounds can be added using various procedures including those described in Collins et al. U.S. Pat. 2,912,343; McCrossen et al. U.S. Pat. 3,342,605; Audran U.S. Pat. 2,996,287 and Johnson et al. U.S. Pat. 3,425,835.

The photographic layers used in the practice of this invention may be coated by various coating procedures including dip coating, air knife coating, curtain coating, or extrusion coating using hoppers of the type described in Beguin U.S. Pat. 2,681,294. If desired, two or more layers may be coated simultaneously by the procedures described in Russell U.S. Pat. 2,761,791 and Wynn British Pat. 837,095. This invention also can be used for silver halide layers coated by vacuum evaporation as described in British Pat. 968,453 LuValle et al. U.S. Pat. 3,219,451.

This invention may be used with elements designed for color photography, for example, elements containing color-forming couplers such as those described in Frohlich et al. U.S. Pat. 2,376,679, Jelley et al. U.S. Pat. 2,322,027, Fierke et al. U.S. Pat. 2,801,171, Godowsky U.S. Pat. 2,698,794, Barr et al. U.S. Pat. 3,227,554 and Graham et al. U.S. Pat. 3,046,129; or elements to be developed in solutions containing color-forming couplers such as those described in Mannes et al. U.S. Pat. 2,252,718, Carroll et al. U.S. Pat. 2,592,243 and Schwan et al. U.S. Pat. 2,950,970; and in false-sensitized color materials such as those described in Hanson U.S. Pat. 2,763,549.

Photographic elements and developer compositions of this invention can be processed or employed in various processing methods including processing in alkaline solutions containing the developing agents; web processing such as described in Tregillus et al. U.S. Pat. 3,179,517; stabilization processing as described in Russell et al. "Stabilization Processing of Films and Papers," PSA Journal, Vol. 16B, August 1950; monobath processing as described in Levy "Combined Development and Fixation of Photographic Images with Monobaths," Photo. Sci. and Eng. Vol. 2, No. 3, October 1958; and Barnes et al. U.S. Pat. 3,392,019. If desired, the photographic elements can be processed in hardening developers such as those described in Allen et al. U.S. Pat. 3,232,761; in roller transport processor such as those described in Russell et al. U.S. Pat. 3,025,779; or by surface application processing as described in Example 3 of Kitze U.S. Pat. 3,418,132.

The invention has been described in detail with particular reference to preferred embodiments thereof, but it will be understood that variations and modifications can be effected within the spirit and scope of the invention.

We claim:

1. A silver halide photographic negative emulsion which contains a cyanine dye having a reduction potential less negative than minus 1.0 and an oxidation potential more positive than plus 0.4 and an alkyl naphthalene sulfonate.

2. An emulsion according to claim 1 comprising a gelatino-silver halide emulsion containing an alkali metal triisopropyl naphthalene sulfonate and a cyanine dye having a reduction potential less negative than minus 1.0 and an oxidation potential more positive than plus 0.4.

3. An emulsion according to claim 2 in which said silver halide is silver bromoiodide.

4. An emulsion according to claim 2 in which the cyanine dye concentration is from 10 to 1000 mg. per mole of silver and and the naphthalene sulfonate concentration is from 100 to 2000 mg. per mole of silver.

5. An emulsion according to claim 2 which is also sensitized with sulfur and gold.

6. An emulsion according to claim 2 in which said cyanine dye is an imidazo[4,5-b]quinoxaline dye.

7. An emulsion according to claim 2 which is a gelatino-silver bromoiodide emulsion and which contains sodium triisopropyl naphthalene sulfonate and 6-chloro-2-[2 - (1-methyl-2-phenyl-3-indolyl)vinyl] - 1,3 - diphenyl-1H-imidazo[4,5-b]quinoxalinium salt.

8. A photographic element comprising a support, a silver halide photographic negative emulsion layer containing a silver halide and a hydrophilic colloid and, in said emulsion layer or in another hydrophilic colloid-containing layer of the element, a cyanine dye which is normally a desensitizer for silver halide emulsions and an alkyl naphthalene sulfonate surfactant in an amount sufficient to substantially reduce the desensitizing effect of said dye.

References Cited

UNITED STATES PATENTS

| | | | |
|---|---|---|---|
| 3,505,070 | 4/1970 | Litzerman | 96—101 |
| 1,653,314 | 12/1927 | Schuloff | 96—101 |

NORMAN G. TORCHIN, Primary Examiner

J. L. GOODROW, Assistant Examiner

U.S. Cl. X.R.

96—69